R. D. BRADDY.
FENDER.
APPLICATION FILED JULY 3, 1915.

1,154,478.

Patented Sept. 21, 1915.
2 SHEETS—SHEET 1.

Witnesses:

Inventor,
R. D. Braddy.
By Victor J. Evans,
Attorney.

R. D. BRADDY.
FENDER.
APPLICATION FILED JULY 3, 1915.

1,154,478.

Patented Sept. 21, 1915.
2 SHEETS—SHEET 2.

Witnesses:
C. Feinle, Jr.
R. M. Smith.

Inventor,
R. D. Braddy.
By Victor J. Evans,
Attorney.

UNITED STATES PATENT OFFICE.

RUFIS D. BRADDY, OF ANACONDA, MONTANA.

FENDER.

1,154,478.  Specification of Letters Patent.  Patented Sept. 21, 1915.

Application filed July 3, 1915.  Serial No. 37,835.

*To all whom it may concern:*

Be it known that I, RUFIS D. BRADDY, a citizen of the United States, residing at Anaconda, in the county of Deer Lodge and State of Montana, have invented new and useful Improvements in Fenders, of which the following is a specification.

This invention relates to fenders particularly designed for use on automobiles, motor trucks and other motor propelled dirigible vehicles, the object in view being to produce a fender which may be readily applied to the present day type of automobile or motor truck, said fender having means whereby it may be fastened directly to the front axle of the machine and also embodying a novel combination of elements whereby the main body of the fender is adapted to yield simultaneously in a rearward and downward direction, thereby cushioning the blow delivered to the person or object struck by the fender and also, by the lowering operation, preventing such person or object from being carried under the wheels and body of the machine.

With the above and other objects in view, the invention consists in the novel construction, combination and arrangement of parts, as herein described, illustrated and claimed.

Figure 1:
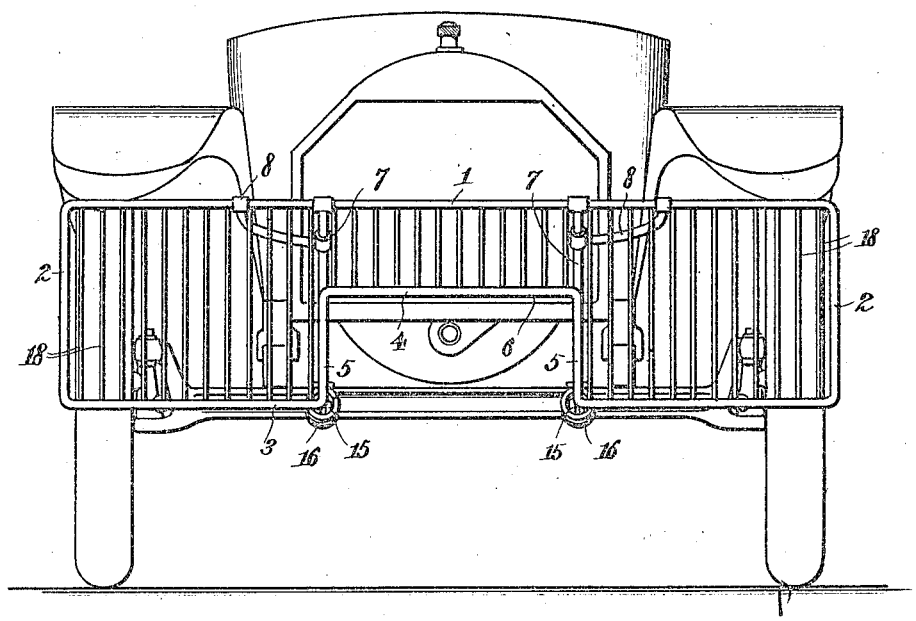
Figure 2:
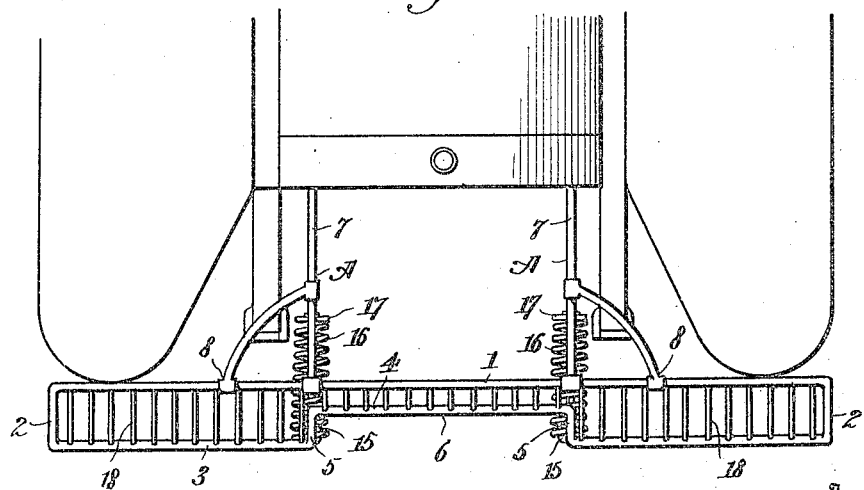
Figure 3:
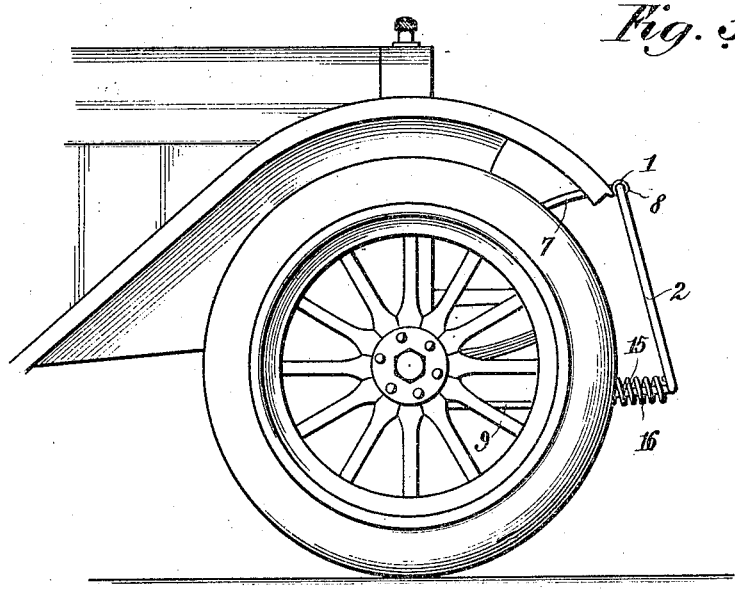
Figure 4:
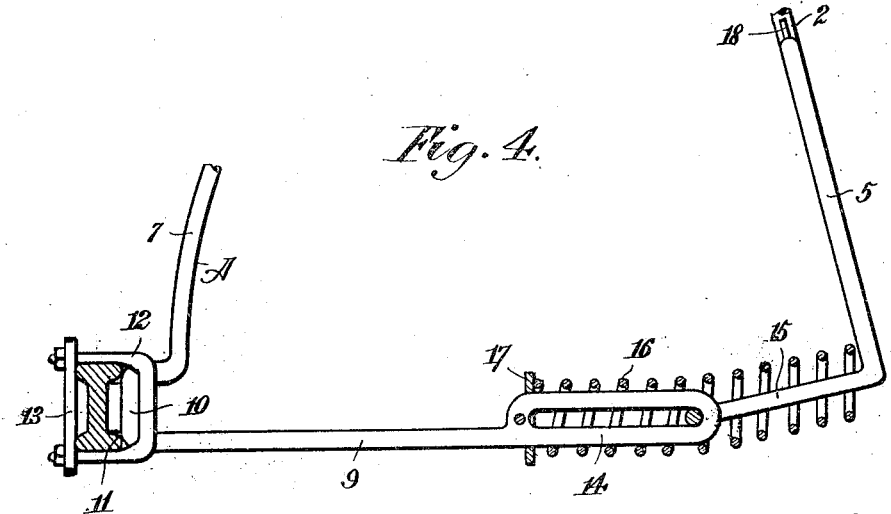

In the accompanying drawings, Figure 1 is a front elevation of the improved fender showing the same applied to an automobile. Fig. 2 is a plan view thereof. Fig. 3 is a side elevation of the same. Fig. 4 is an enlarged detail view of the yielding connection between the supporting members and body of the fender.

The main body of the fender is preferably composed of tubing and comprises a top horizontal bar 1, substantially vertical end bars 2 and a bottom bar 3, the central portion of which is offset in an upward direction to provide a three-sided extension comprising the horizontal bar 4 and the side or end bars 5 which connect the bars 3 and 4. This leaves an open space designated at 6 to allow for starting the engine with the use of the ordinary hand crank, while at the same time allowing the opposite side or end portions of the body to extend low enough to prevent persons and objects from getting under the front wheels of the machine.

The body of the fender hereinabove described is sustained in its operative position by means of a pair of supporting members designated generally at A, each of said supporting members A comprising an upper arm 7 connected at 8 to the top bar of the fender body, and a lower arm 9 connected to the bottom portion of the fender as hereinafter described, the arms 8 and 9 being connected by substantially vertical portions 10 which bear against the front side of the axle shown at 11 and are held in fixed relation thereto by means of U-shaped bolts 12 extending above and beneath the axle and passing through bridge plates 13 at the rear of the axle as clearly shown.

Each of the arms 9 terminates in an elongated loop 14 which passes through another correspondingly shaped loop 15 extending rearwardly from the bottom of the fender body at the angle formed between the bottom bar 3 thereof and the adjacent upwardly extending bar 5. A helical expansion spring 16 encircles the loops 14 and 15, one end of said spring bearing against the body of the fender frame and the other extremity of said spring bearing against a plate 17 having a fixed relation to the lower arm 9 of the adjacent supporting member.

From the foregoing description, taken in connection with the accompanying drawings, it will now be understood that normally the fender is in the position illustrated in Fig. 3, inclining slightly forward toward the bottom thereof and providing ample road clearance between the fender and the road surface. When the fender body comes into contact with a person or object, the loops 14 and 15 slide relatively to each other, the lower portion of the fender body moving rearwardly and at the same time downwardly, compressing the spring 16. This serves to cushion the blow imparted to the person or object struck by the fender, at the same time preventing such person or object from getting under the wheels and body of the car.

18 designates stays or net work of any kind connected to the oppositely arranged bars of the fender body and forming in connection with the remainder of the body an efficient, light and practical fender especially adapted for use upon automobiles, motor trucks and the like.

What I claim is:—

The combination with the front axle of an automobile, of fender supports fastened thereto and each comprising an upwardly inclined arm and a downwardly inclined arm, the latter having a loop at its forward end, a fender body having a jointed connection with the upper arms of said supports and having backwardly extending loops slidable in the loops of the lower arms of said supports, shoulders at the rear ends of the last named loops, and coiled expansion springs encircling the relatively slidable loops of the supports and fender body and interposed between said shoulders and the fender body.

In testimony whereof I affix my signature in presence of two witnesses.

RUFIS D. BRADDY.

Witnesses:
 IRENE SUGRUE,
 JOHN W. JAMES.